United States Patent [19]
Becker

[11] 4,084,834
[45] Apr. 18, 1978

[54] MOBILE HOME FRAME

[76] Inventor: Willi Becker, 1315 Lake Bonavista Drive South East, Calgary, Alberta, Canada

[21] Appl. No.: 729,057

[22] Filed: Oct. 4, 1976

[30] Foreign Application Priority Data

Aug. 12, 1976 Canada ................................. 258963

[51] Int. Cl.² ............................................. B62D 21/00
[52] U.S. Cl. ............................... 280/106 T; 296/28 R
[58] Field of Search ..................... 280/106 T, 106 R; 296/28 R

[56] References Cited

U.S. PATENT DOCUMENTS

| | | | |
|---|---|---|---|
| 2,812,192 | 11/1957 | Cole | 280/106 T |
| 3,704,028 | 11/1972 | Grewer | 280/106 T |
| 3,940,162 | 2/1976 | Winslow | 280/106R |

*Primary Examiner*—Philip Goodman

[57] ABSTRACT

The invention provides an underframe for use in a transportable home, the underframe including a pair of longitudinally extending side girders positioned in parallel and spaced from one another by almost the width of the home to be built on the underframe. A plurality of transverse elements are rigidly attached to the side girders and spaced from one another and each of the transverse elements as an upper extremity below that of the side girder. At least one longitudinal member is positioned between the side girders, and means are attached to the transverse elements and to the longitudinal member to support the longitudinal member above the transverse elements.

7 Claims, 6 Drawing Figures

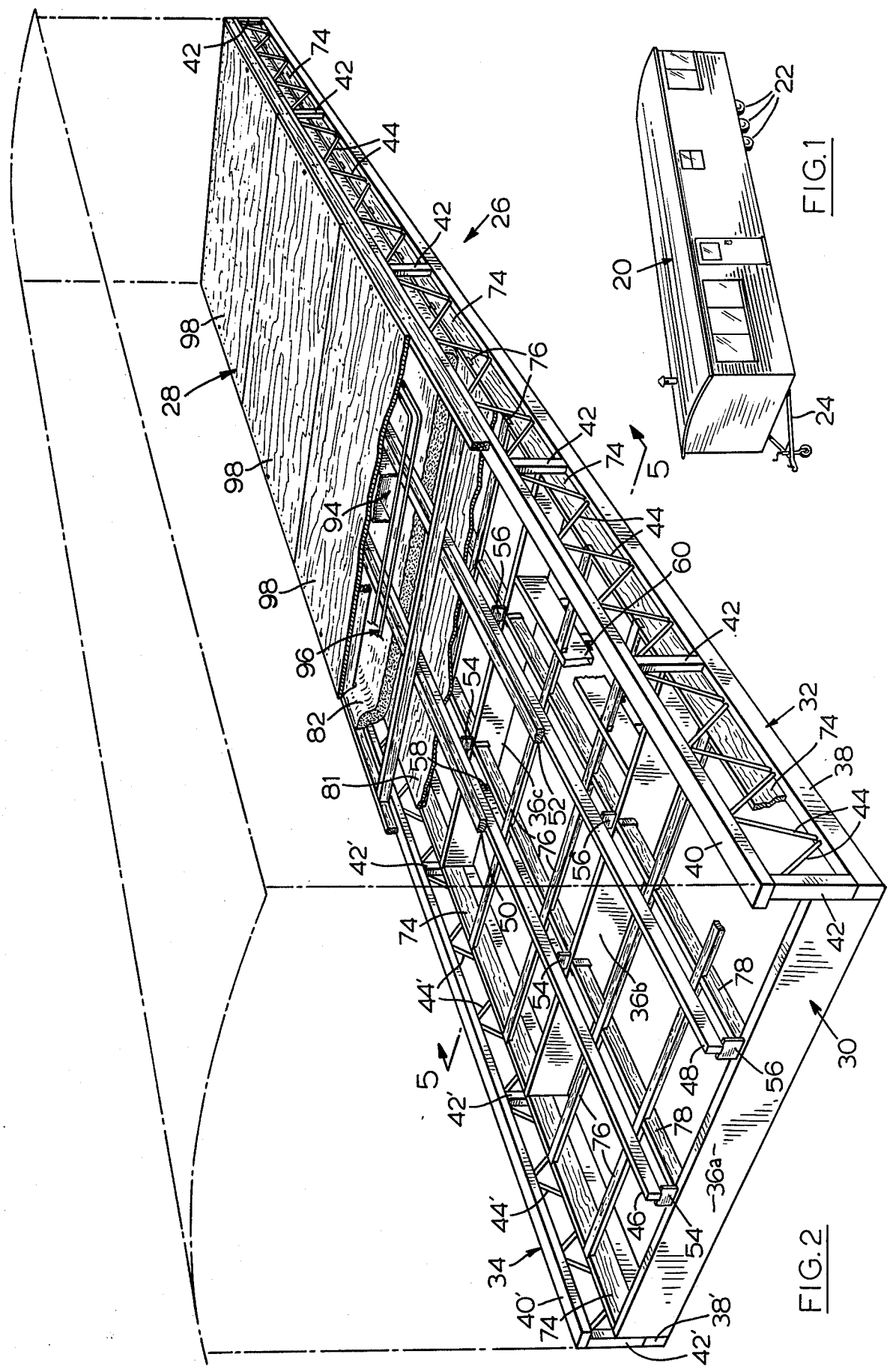

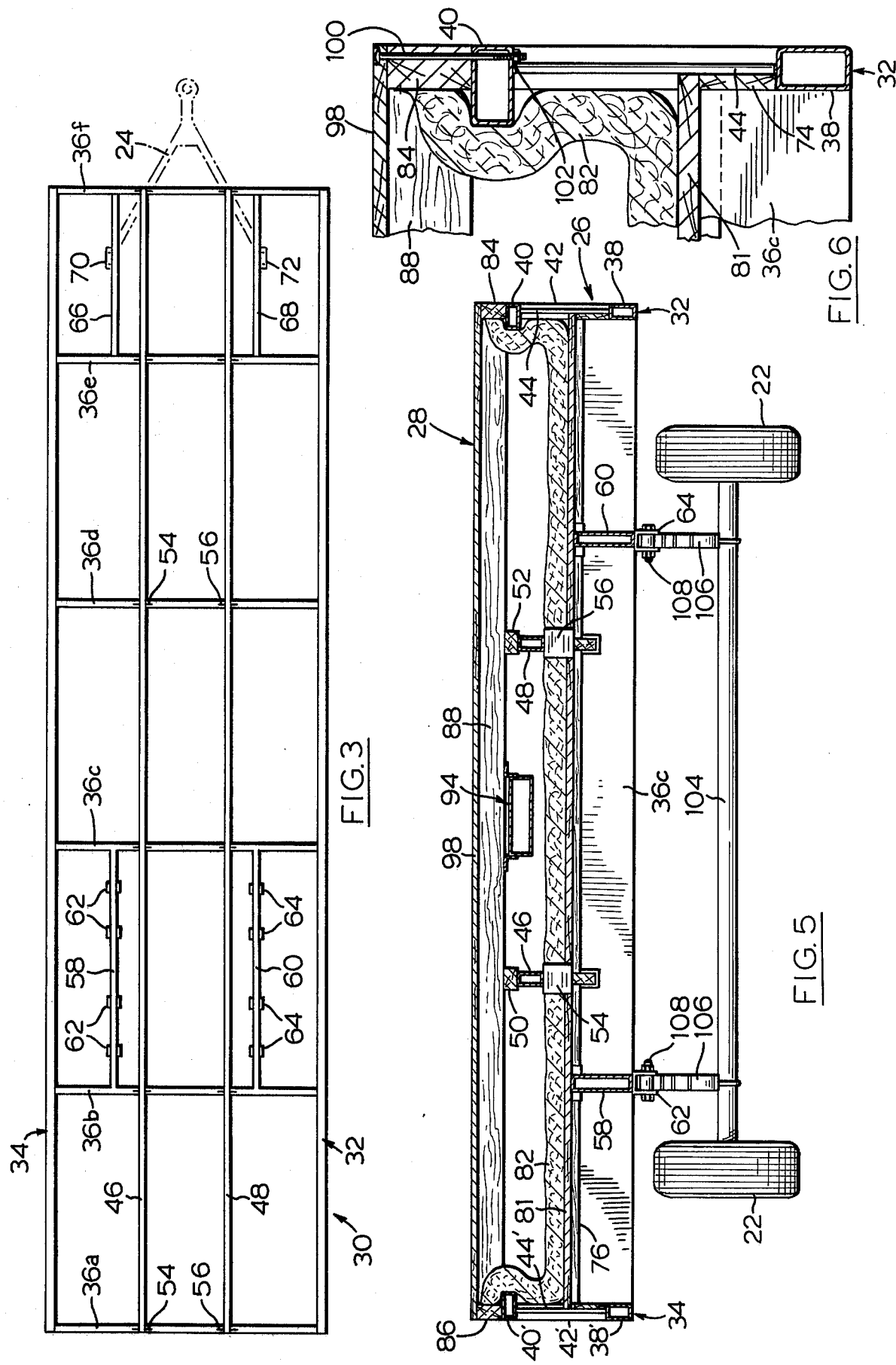

MOBILE HOME FRAME

This invention relates to transportable homes, often called mobile homes, and more particularly to an underframe for use in building such homes.

When a transportable home is delivered, it is first levelled on a site and then supported off the ground on many blocks or even on walls in some instances. The extensive support is necessary because the structure is long and lacks longitudinal stiffness. In understanding the problems associated with such structures, it is convenient to think of the conventional transportable home as a wood home sitting on a steel frame which is there mainly to permit the home to be moved. Although the frame lends some structural rigidity to the home, the wood structure is relied upon to withstand flexural forces when the home is transported. Accordingly, it is not uncommon for transportable or mobile homes to require repair after delivery and although the mobile home is supposedly designed for moving whenever necessary, each move may result in damage to the home caused by the lack of rigidity of the overall structure.

Further disadvantages with present home structures become apparent when reviewing the method of manufacture. Initially, the frame is made and purchased by the manufacturer who completes the home. The wood home structure is then built on the frame commencing with floor joists which are placed across the frame. Also, it is not uncommon for the assembly procedure to require the frame to be turned over while services are positioned under the floor. This procedure is hazardous and requires a large floor space.

A further disadvantage lies in the fact that the services must be positioned under the floor where there is limited access. Modern frames include a longitudinally extending duct or channel positioned centrally in the frame for receiving the major services. The duct has many advantages over prior art structures but nevertheless does not accommodate all of the services and difficulties are encountered when the services must be positioned outside the duct. This is particularly true in areas where heavy insulation must be used to withstand colder climates.

Because the present underframes are are relatively weak, the wheels used in transporting the homes are mounted on a dolly which in turn is positioned under the longitudinal members of the frame. The dolly tends to be somewhat expensive and when the home is stationary, serves no purpose. Consequently, the expense of the dolly is something which would preferably be avoided by anyone purchasing a transportable home. The same reasoning applies to the towing bracket normally found at the front of the frame.

The present invention is directed to providing an underframe for a transportable home having a structure which is relatively rigid and which forms an integral part of the home. The underframe provides space for services across the entire width of the home and along the full length of the home. A floor structure including services can be built and then laid on the underframe before completing the assembly by adding panels to form a floor. The home is finished by building on this assembly. Running gear and towing brackets can be attached during transportation and removed later so that the purchaser of a home can simply rent this equipment thereby reducing the initial cost of the home.

Accordingly, the invention provides an underframe for use in a transportable home, the underframe including a pair of longitudinally extending side girders positioned in parallel and spaced from one another by almost the width of the home to be built on the underframe. A plurality of transverse elements are rigidly attached to the side girders and spaced from one another and each of the transverse elements has an upper extremity below that of the side girder. At least one longitudinal member is positioned between the side girders, and means are attached to the transverse elements and to the longitudinal member to support the longitudinal member above the transverse elements.

The invention will be better understood with reference to the following description in combination with the drawings, in which:

FIG. 1 is a perspective view of a transportable home incorporating a preferred embodiment of the invention;

FIG. 2 is a partially broken away perspective view from the rear and one side of a preferred embodiment of a chassis and floor combination incorporating an underframe according to the invention;

FIG. 3 is a plan view of the underframe used in the chassis shown in FIG. 2;

FIG. 5 is a cross-sectional end view on line 5—5 of FIG. 2; and

FIG. 6 is a view similar to FIG. 5 of a portion of the assembly drawn to a larger scale.

Figure 4:
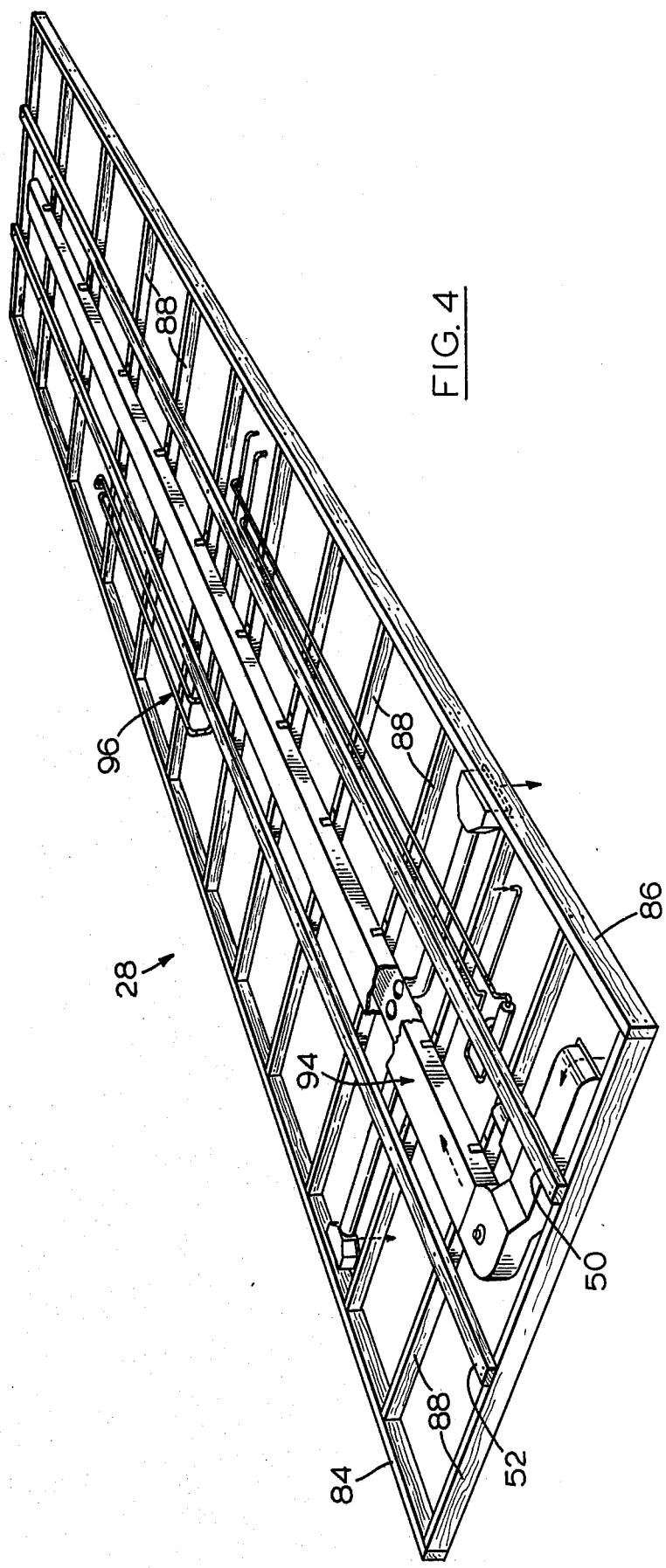
FIG. 4 is a view of the floor during manufacture and before the floor is turned over into the position it occupies in FIG. 2.

As seen in FIG. 1, a transportable or mobile home is shown incorporating an underframe according to the invention. The transportable home includes a body 20 supported on three pairs of wheels 22 and having a removable towing bracket 24. The transportable home is normally moved to a semi-permanent site using the towing bracket 24 and wheels 22. As will be described, the wheels and towing bracket can be removed after the transportable home is located on a site. In instances where the home is to be moved from one site to another site, the wheels and towing bracket will be attached and the support structure used underneath the home dismantled before the home is towed to the next site.

The transportable home shown in FIG. 1 uses a chassis and floor structure combination will be described with reference to subsequent drawings. Parts of the combination will be introduced generally in the order in which they are assembled.

As seen in FIG. 2, a chassis 26 supports a floor structure 28 and the assembly is ready to receive the walls of a home as indicated in ghost outline. To manufacture this assembly, an underframe is first welded together into the form shown in FIG. 3. Referring to FIGS. 2 and 3, an underframe 30 consists of a pair of deep prefabricated side girders 32, 34 which are inter-connected by a series of spaced transverse elements 36a, 36b etc. Each of the transverse elements is of a rectangular box section and of a depth substantially less than that of the side girders 32, 34. The bottom extremities of the transverse elements lie in a plane common with the corresponding extremities of the side girders 32, 34.

The side girder 32 will now be described in more detail. This girder is a mirror image of girder 34 and parts of the girder 34 corresponding to those described with reference to girder 32 will be given corresponding primed reference numerals.

The side girder 32 includes a bottom element 38 having a rectangular box section with the longer side upright. This bottom element is connected to a top element 40 by spaced uprights 42 and by angled spacers 44 which are welded both to the bottom element and to the top element. The uprights 42 are proportioned to have the same transverse extent as the bottom element 38 and the top element 40 has a similar cross-section to the bottom element 38 but is positioned with the shorter side of the cross-section in an upright position and lying in a plane containing the outer surfaces of the uprights 42 and of the bottom element 38.

The bottom element 38 is positioned to have the wide sides vertical to give a maximum depth to the girder thereby improving the longitudinal stiffness of the underframe. By contrast, the top element 40 is arranged with the corresponding wide sides horizontal to give a good bearing surface for the floor structure as will be described.

Each of the transverse elements 36a, 36b, etc. is positioned between a pair of the uprights 42, 42' of the side girders 32, 34 and welded to these uprights as well as to the bottom elements 38, 38'. The vertical extent of the transverse elements 36a, 36b, etc. is less than that of the side girders 32, 34 to provide space for services which run longitudinally of the chassis as will be described. However, because further support is required for the floor structure between the girders, shallow box section longitudinal elements 46, 48 are provided with their upper extremities below the upper extremities of the side girders by an amount equal to the thickness of a pair of respective wood strips 50, 52 which form part of the floor structure and which are to be attached to the longitudinal elements as will be described.

Each of the longitudinal elements 46, 48 is supported from the transverse elements 36a, 36b, etc. by a series of thin upright supports 54, 56 formed from thin steel plates and welded to the transverse elements 36a, etc. such that the supports lie generally longitudinally of these elements. Consequently, the longitudinal elements are in position to support the floor structure 28 and yet there is space under these elements for services. This space (which is sometimes known as the "basement space") also facilitates a further assembly as will be described.

As seen in FIGS. 2 and 3, the underframe 30 also includes wheel mounting elements 58, 60 which extend longitudinally between transverse elements 36b, 36c. The elements 58, 60 are provided with downwardly extending mounting brackets 62, 64 for use in attaching wheel springs as will be described with reference to FIG. 5. Each of the wheel mounting elements 58, 60 has a similar cross-section to that of the transverse elements 36b, 36c and is welded to these elements.

At the forward end of the underframe 30, a pair of towing members 66, 68 also extend longitudinally and are welded between transverse elements 36e, 36f. Each of the towing members has one of a pair of brackets 70, 72 attached by welding. The brackets are provided to receive a rearward extremity of towing bracket 24 which is shown in ghost outline in FIG. 3. Further brackets can be provided on the underframe for receiving the towing bracket 24 as required.

The underframe portion of the chassis 26 has now been completed. Before the floor structure 28 can be added to the chassis, further parts must be added to the underframe to complete the chassis as will now be described.

As seen in FIG. 2, a series of side boards 74 are positioned on bottom elements 38 in engagement with inner surfaces of the angled spacers 44 and in end abutment with respective transverse elements 36a, 36b, etc. Each of the side boards 74 is notched in its upper surface to receive respective transverse strips such as the strips 76 positioned between the transverse elements 36a, 36b. These transverse strips are also supported by a pair of longitudinal supports 78 which are also notched to receive the transverse strips 76. The supports 78 are engaged in suitable hanger brackets welded to the transverse elements 36a, 36b, etc.

Between the transverse elements 36b, 36c, transverse strips such as the strips 76 previously described cannot be used because of the positioning of the wheel mounting elements 58, 60. The problem is overcome by the use of hangers on these elements so that the strips are broken into three parts and suspended from the side boards 74 and from the wheel mounting elements 58, 60. A similar arrangement is used where the transverse strips meet the towing members 66, 68 (FIG. 3).

Next, a sub-floor 81 is placed on the transverse strips 76 by laying sheets of fibreboard on these strips. It will be appreciated that the arrangement of the longitudinal elements 46 is such that the sheets forming the sub-floor can be slid transversely under these elements and into position between the side girders 32, 34. Normally, the sheets come in a 4 feet width and consequently, it is convenient to arrange for the transverse strips 76 to lie in positions where edges of the sheets will meet above one of the strips or above one of the transverse elements 36a, 36b, etc. For instance, as drawn, the first sheet would rest on the transverse element 36a, and on the rearmost one of the strips 76 as well as having an edge lying generally on the centre of the second of the strips 76. A further sheet would then be split into two 2 feet portions and one of the portions would be engaged between the supports 54, 56 on the transverse element 36b and the sheet already in place. It will be appreciated that by using thin plate-like supports 54, 56 there is a minimal spacing between the sheets or portions of the sheets where they meet above a transverse element. The edges of the board will therefore rest on the transverse elements 36b, 36c, etc. in close abutment with the supports 54, 56. The boards are a slight friction fit so that they remain in place without fasteners. Consequently, the services which will be positioned above these boards will be accessible from below by displacing a board upwardly and sliding it over an adjacent board. (Insulation lying on the boards may have to be cut to gain access but this can be repositioned without difficulty.)

After the sub-floor 81 has been positioned, it will be appreciated that only the longitudinal elements 46, 48 lie above the sub-floor 81 and that these elements are spaced upwardly above the sub-floor. Further, there are no transversely extending projections so that insulation can be laid on the sub-floor by taking rows of insulation of suitable width and unrolling them between the longitudinal elements 46, 48 and the side girders 32, 34. This facilitates laying insulation 82 which is shown in FIGS. 2, 5 and 6 in a final installed position. At the present stage in the assembly, sides of the insulation are not positioned against the side girders but are bent inwardly away from the side girders preparatory to positioning the floor structure 28 on the finished chassis 26.

Reference is now made to FIG. 4 to describe floor structure 28 which is shown in the inverted condition it occupies during assembly and before it is placed on the chassis 26 (FIG. 2). The floor structure includes elongated side portions 84, 86 which are connected to one another by a plurality of transverse portions 88. The side portions and transverse portions are of wood and they are nailed together as shown to form a floor frame. Subsequently, this frame is placed on a jig or fixture which guides assembly of the various components in the services. The wood strips 50, 52 are nailed to the transverse portions 88 in positions for subsequently resting on the respective longitudinal elements 46, 48 shown in FIG. 2.

Next, the various services associated with the transportable home and which normally appear under the floor are affixed to the floor frame in an inverted position. On inverting the floor structure, the services are in the correct upright positions and include ducting 94 associated with home heating and various plumbing 96 associated with the water services in the home. These parts are exemplary only and it should be noted that the only limitations to the positioning of the services are the wood strips 50, 52 and the depth provided between the insulation 82 and the underside of the floor frame (i.e. the top side as drawn in FIG. 4) after assembly. It will be apparent that the arrangement gives great flexibility for installing services and that the style of transportable home which can be built on the chassis can vary considerably without requiring any change in the chassis structure.

When the services have been installed to the extent they can be completed under the floor, the floor structure 28 is inverted and laid on the chassis 26 with the side portions 84, 86 on the respective side girders 32, 34 and the strips 50, 52 on the longitudinal elements 46, 48. The relative positions of these parts are better seen in FIG. 5 where the floor structure 28 has been added.

The installation of insulation 82 which was done partially earlier can now be completed. As seen in FIG. 5, the insulation is brought up the side girders 32, 34, over the top elements 40, 40' of these girders and into engagement with inner faces of the side portions 84, 86 of the floor structure. The insulation can be stapled to these side positions to retain the insulation in place.

The floor structure 28 is attached firmly to the chassis 26 by using self-drilling and tapping bolts which pass through the wood strips 50, 52 and into the longitudinal elements 46, 48 at intervals along these elongated longitudinal elements. Next, floor boards 98 of particleboard are nailed in place and the floor structure is further attached as illustrated in FIG. 6. Long coach bolts such as bolt 100 sit in counter-bores in the floor 98 and pass through suitable openings formed through the side portion 84 of the floor structure and through the top elements 40, 40' of the side girders 32, 34. Nuts 102 are engaged on the lower ends of the bolts 100 in engagement with the underside of the top elements so that tension can be applied to hold the floor structure firmly in engagement with the chassis. Also, because of this firm engagement, the floor structure and chassis combine to create a relatively rigid foundation for subsequent completion of a transportable home as shown in FIG. 1.

Returning to FIG. 5, this FIG. illustrates how the wheels 22 previously mentioned with reference to FIG. 1 are attached to the chassis. A typical pair is shown in FIG. 5 mounted on a road axle 104 which is attached by springs 106 to the brackets 62 on the underside of the wheel mounting elements 58, 60. The arrangement for attaching the wheels is such that once the transportable home has been located for use, the home can be jacked up onto a suitable foundation and the wheels, axle and springs removed by releasing shackle bolts 108. Consequently, the purchaser of such a home can quite readily rent the wheels etc. and return them after the home has been delivered and placed in position. Similarly, the arrangement by which the towing bracket 24 is attached is such that this also can be removed quite readily so that the purchaser of the home need not necessarily buy this bracket.

Although a complete transportable home has not been described, it will be evident how the home is completed. One detail of note is that after completion, the siding used in the home will come down to the level of the bottom elements 38, 38' of the side girders. Consequently, the side girders will be fully enclosed and during transportation, the services will be fully protected.

One variation which would be advantageous to some owners would be to use a sub-floor 81 made up of panels which are less than the width of the full sub-floor. This could be done by using panels which have boundaries resting on the strips 78 so that servicing is facilitated from below because each panel is smaller to handle.

Other variations are possible within the scope of the invention as defined in the claims.

What I claim as my invention is:

1. An underframe for use in transportable accommodation of the type known as a mobile home, the underframe comprising:
    a pair of longitudinally extending side girders positioned in parallel and spaced from one another by almost the width of the mobile home;
    a plurality of transverse elements having ends rigidly attached to the side girders and spaced from one another, each of the transverse elements having an upper extremity below those of the side girders;
    at least one shallow longitudinal member positioned between the side girders; and
    a plurality of thin plate-like elements attached to the transverse elements and to the longitudinal member to support the longitudinal member in position spaced above the transverse elements, the plate-like elements being positioned to extend longitudinally of the respective transverse elements to which they are attached.

2. An underframe as claimed in claim 1 in which each of the side girders includes a bottom element, a top element, and uprights extending between the elements and located at ends of the transverse elements, these transverse elements being attached to the side girders at the uprights and at the bottom element.

3. An underframe as claimed in claim 1 in which each of the side girders includes a bottom element, a top element and uprights extending between the elements and located at ends of the transverse elements, these transverse elements being attached to the side girders at the uprights and at the bottom element, and inclined angled spacers attached to both the upper and to the lower elements of the side girders.

4. A chassis for use in accommodation of the type known as a mobile home, the chassis comprising an underframe as claimed in claim 1 and a sub-floor supported on the side girders and on the transverse elements sufficiently below the upper extremities of the side girders to provide space for services below said upper extremities.

5. A chassis for use in accommodation of the type known as a mobile home, the chassis comprising an underframe as claimed in claim 1; longitudinal supports extending between the transverse elements; side boards coupled to the side girders; transverse strips extending between the side boards and resting on the longitudinal supports, the upper surfaces of the side boards, the transverse strips, and the transverse elements being in a common plane; and a sub-floor laid on said upper surfaces of the transverse strips, the side boards, and the transverse elements.

6. For use in accommodation of the type known as a mobile home, an underframe as claimed in claim 1 and a floor structure resting on the side girders and on the longitudinal member and attached thereto.

7. For use in accommodation of the type known as a mobile home, an underframe as claimed in claim 1; a sub-floor supported on the side girders and on the transverse elements sufficiently below the upper extremities of the side girders to provide space for services below said upper extremities; and a floor structure resting on the side girders and on the longitudinal member and attached thereto.

* * * * *